Figure 1:
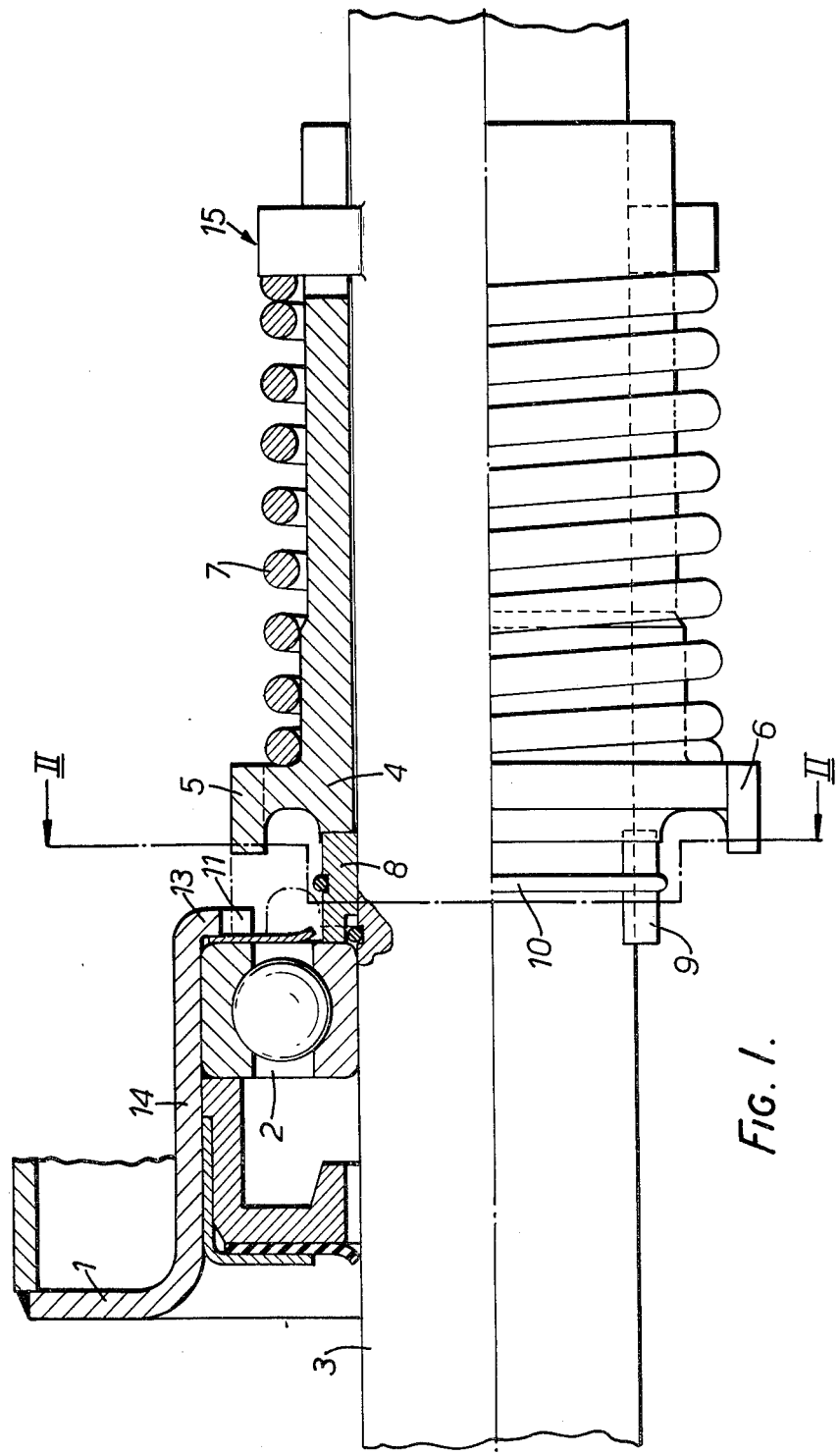

United States Patent [19]
Price

[11] Patent Number: 4,477,126
[45] Date of Patent: Oct. 16, 1984

[54] LOCKING DEVICES
[75] Inventor: Derek T. Price, Worcester, England
[73] Assignee: Dowty Meco Limited, England
[21] Appl. No.: 348,783
[22] Filed: Feb. 16, 1982
[30] Foreign Application Priority Data
  Feb. 26, 1981 [GB] United Kingdom ............... 8106116
[51] Int. Cl.³ .................. F16C 13/00; F16C 19/52
[52] U.S. Cl. ................ 308/1 A; 188/82.84; 188/110
[58] Field of Search ........... 308/1 R, 1 A, 189 R, 308/190, 191, 207 R, 208, 210; 403/28, 343, 350; 192/82 T; 188/69, 79.5 B, 82.8, 82.84, 110, 382; 464/17, 31; 384/416–418

[56] References Cited
U.S. PATENT DOCUMENTS

| 2,345,108 | 3/1944 | Goepfrich | 188/79.5 B |
| 2,612,970 | 10/1952 | Discount | 188/82.84 |
| 2,670,059 | 2/1954 | Link | 188/79.5 B |
| 2,824,625 | 2/1958 | Rice | 188/82.84 |
| 3,903,712 | 9/1975 | Richter et al. | 464/31 |
| 4,058,353 | 11/1977 | Frommlet et al. | 308/1 A |

FOREIGN PATENT DOCUMENTS 1599670 7/1977 United Kingdom ............... 308/1 A

Primary Examiner—John M. Jillions
Assistant Examiner—David Werner
Attorney, Agent, or Firm—Hayes, Davis & Soloway

[57] ABSTRACT

A locking device, for a member (for example a roller of a belt conveyor) mounted by way of a bearing on a shaft which member and shaft are relatively-rotatable, includes a heat-sensitive member. The heat-sensitive member normally holds the locking device out of its operative engagement and is disposed close to the bearing with part at least outside the shaft. The heat-sensitive member is made from a fusible material, or alternatively may comprise a bi-metallic element.

10 Claims, 10 Drawing Figures

LOCKING DEVICES

This invention relates to locking devices which can be operated to lock rotary members against further rotation. Such a device is particularly useful in locking an idler roller of a belt conveyor when the bearings associated with the roller overheat due to a failure. The following description will be directed to locking devices in accordance with the invention when used with idler rollers of belt conveyors, but it is to be understood that the invention is not limited to such use.

If, in use, the bearing of an idler roller becomes damaged and the roller continues to rotate under the driving force of the belt, a considerable amount of heat is generated, which is concentrated in the region of the bearing, and there is then a serious risk of fire. In contrast, if the roller is prevented from rotating, so that the belt then slides over the stationary roller, the heat generated by friction is carried away by the moving belt and the heat concentration in the region of the bearing is much less than it would be if the roller continued to rotate, and the risk of fire is reduced.

It is an object of this invention to provide a locking device which can lock a rotary member against further rotation.

Acording to this invention a locking device, for a member mounted by way of a bearing on a shaft which member and shaft are relatively-rotatable, includes a heat-sensitive member which normally holds the locking device out of its operative engagement and which is disposed close to said bearing with part at least outside said shaft. Preferably, the whole of said heat-sensitive member is disposed outside the shaft.

The heat-sensitive member may be made from a fusible material, or, alternatively, may comprise a bi-metallic element.

Means may be provided whereby movement of the locking device into its operative condition to lock said member or shaft, whichever is rotating, is caused to occur progressively.

When a bearing fails, heat is generated in the region of the bearing, and the heat-sensitive member of the locking device, being closely adjacent to the bearing, is operable to cause the locking device to move into operative engagement to lock the member or shaft, whichever is rotating, against the stationary shaft or member as the case may be. For example where the heat-sensitive member is of a fusible material, that material melts, or, where the heat-sensitive member is in the form of a bi-metallic element, the shape of that element so changes as to effect said locking.

Where locking is caused to occur progressively abruptness in operation is avoided with the result that less severe loading is placed on the components of the locking device.

Figure 2:
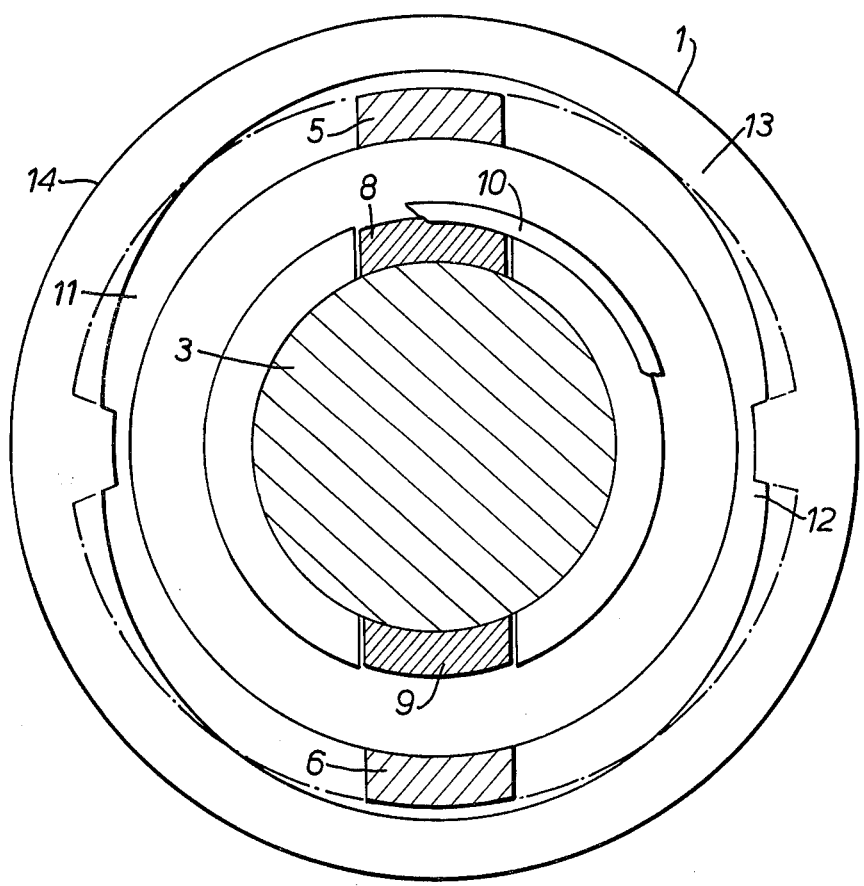
Figure 3:
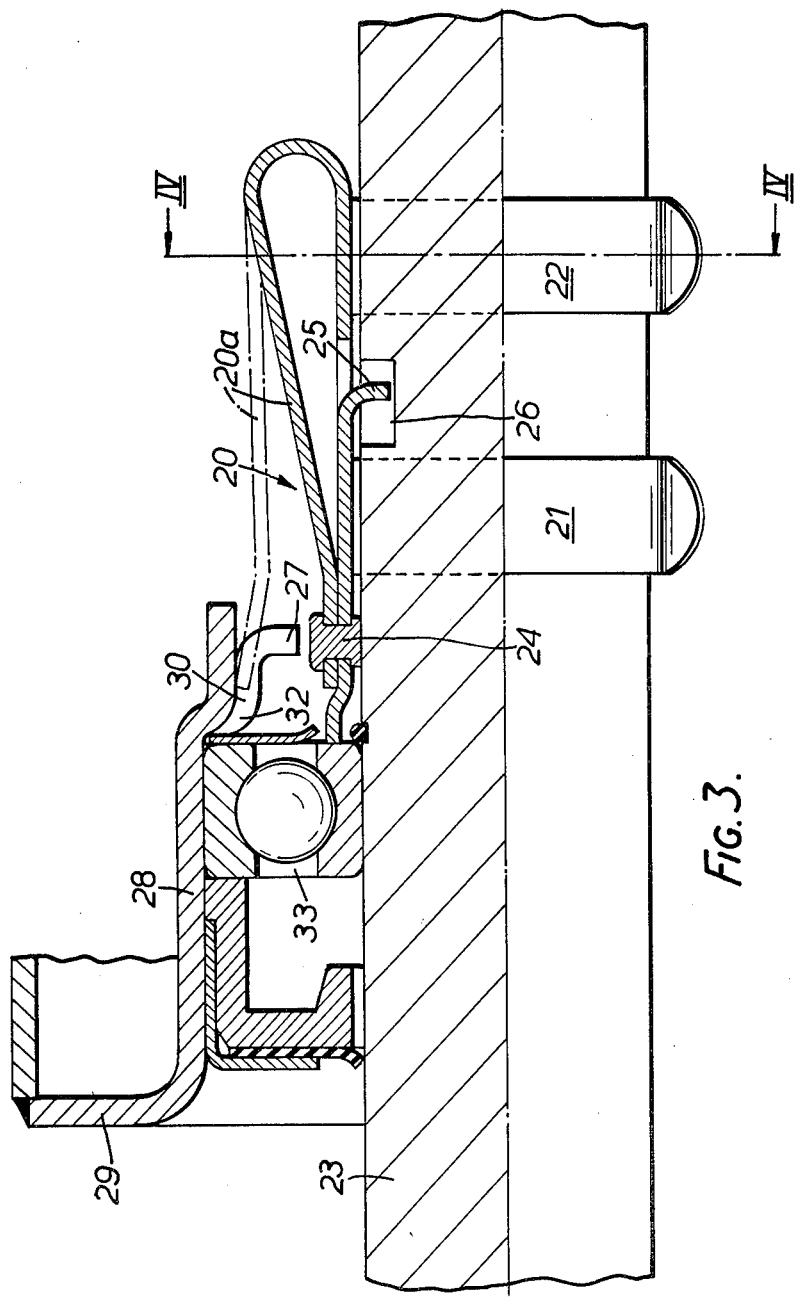
Figure 4:
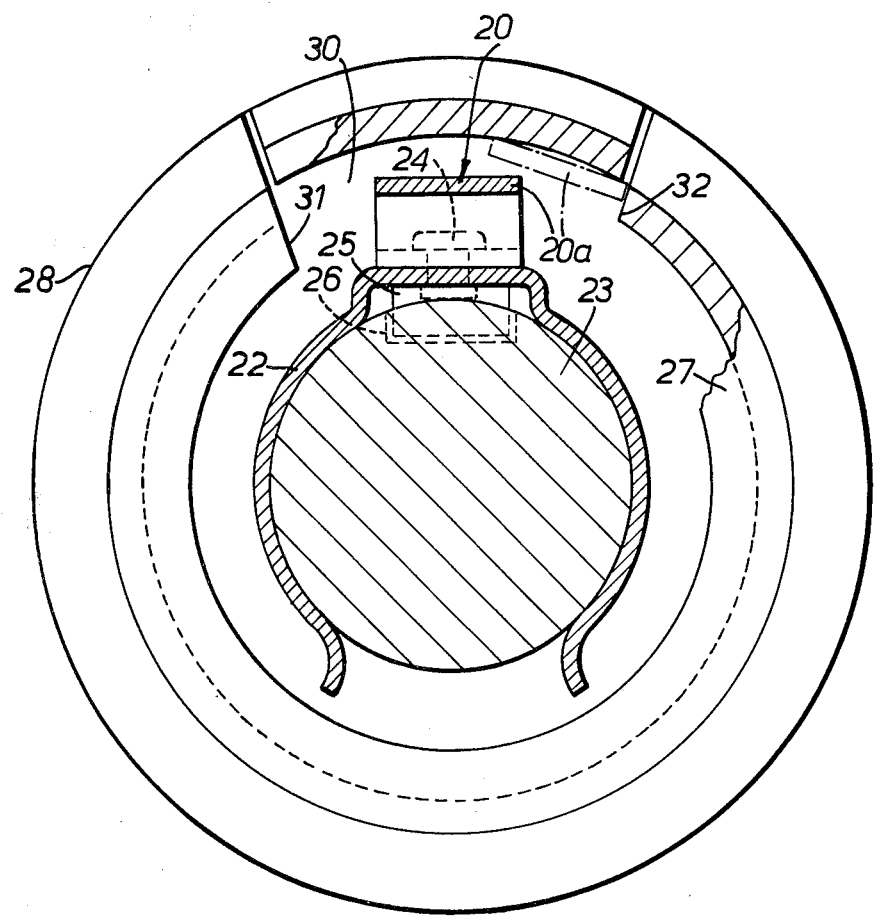
Figure 5:
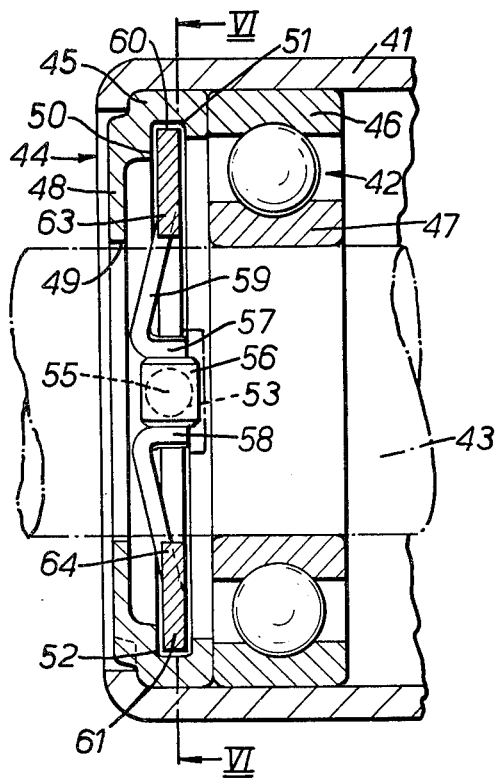
Figure 6:
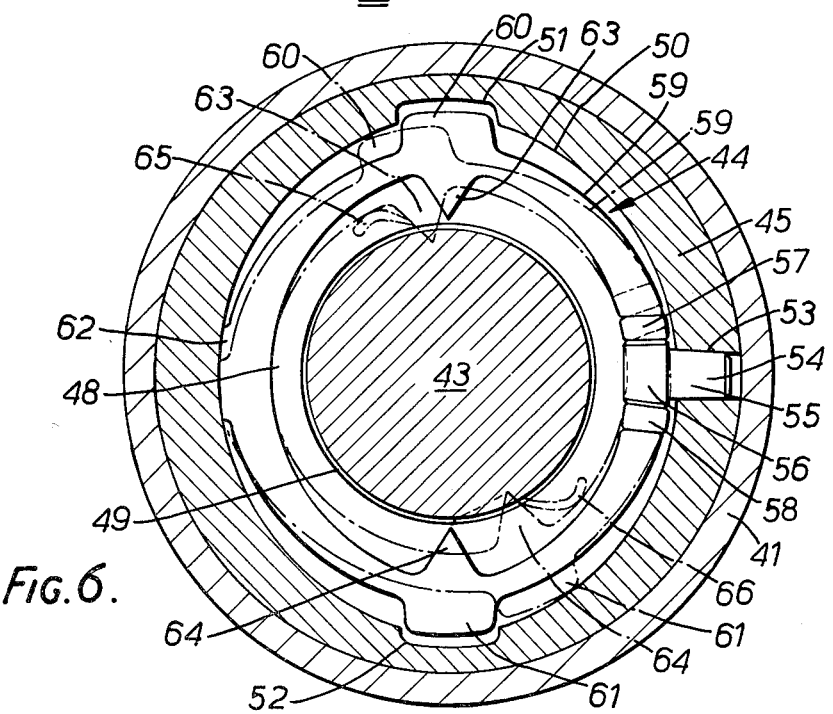
Figure 7:
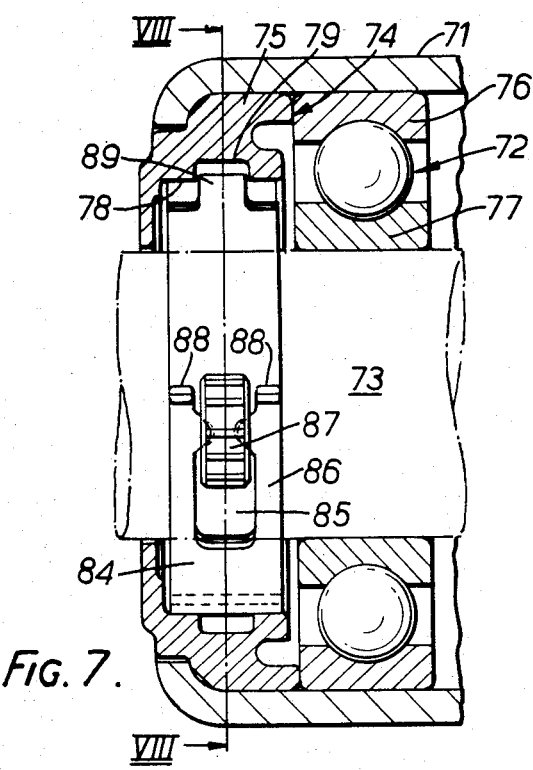
Figure 8:
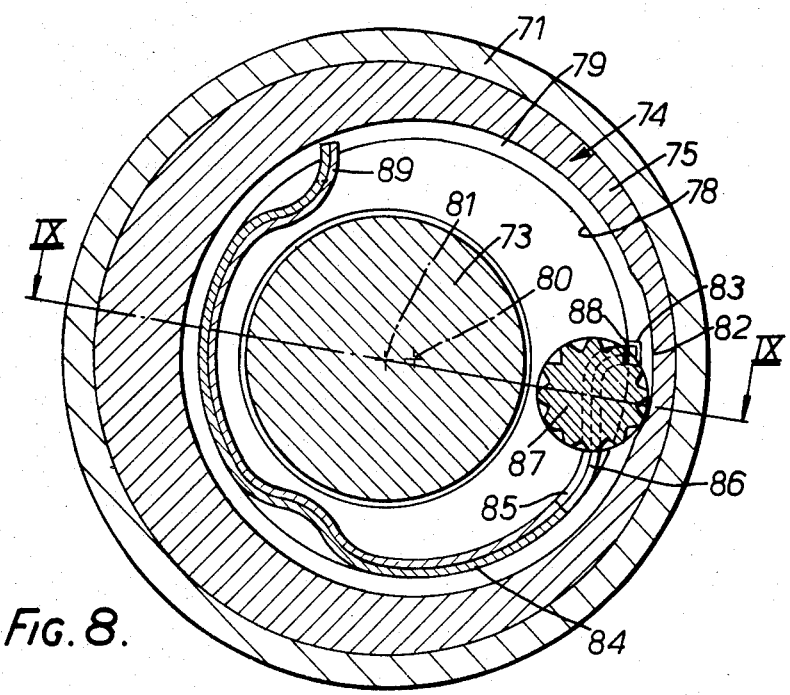
Figure 9:
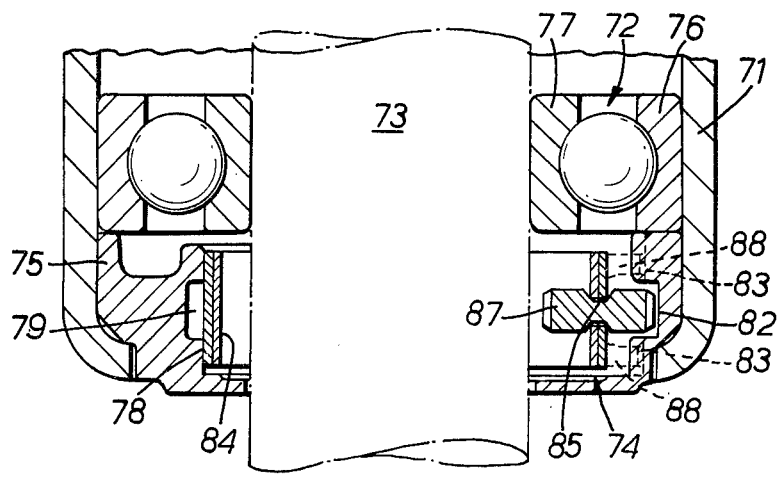
Figure 10:
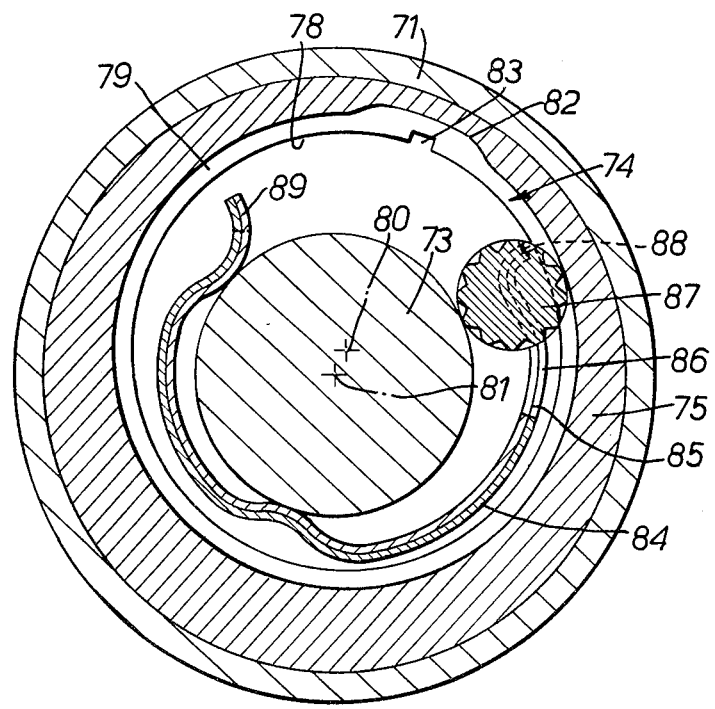

Four ways of carrying out the invention are described in detail below with reference to drawings which illustrate four specific embodiments, in which:

FIG. 1 is a side elevation, partly in cross-section, of a locking device and associated bearing assembly in accordance with the first embodiment of the invention, FIG. 2 is an enlarged cross-section taken along the line II—II in FIG. 1, FIG. 3 is a side elevation, partly in cross-section, of a locking device and associated bearing assembly in accordance with the second embodiment of the invention, FIG. 4 is an enlarged cross-section taken along the line IV—IV in FIG. 3, FIG. 5 is a cross-sectional side elevation of a locking device and associated bearing assembly in accordance with the third embodiment of the invention, FIG. 6 is a cross-section taken along the line VI—VI in FIG. 5, FIG. 7 is a cross-sectional side elevation of a locking device and associated bearing assembly in accordance with the fourth embodiment of the invention with the locking device in its unlocked condition, FIG. 8 is a cross-section taken along the line VIII—VIII in FIG. 7 with the locking device again in its unlocked condition, FIG. 9 is a cross-section taken along the line IX—IX in FIG. 8, and, FIG. 10 is a view similar to that of FIG. 8, but with the locking device in its locking condition.

Referring to FIGS. 1 and 2, a roller 1 (only part of which is shown) is mounted at each end portion (only one of which is shown) by way of a bearing 2 for rotation about a stationary shaft 3.

The locking device includes a cylinder 4 which is prevented from rotating with respect to the shaft 3 by a pin-and-slot connection 15. The cylinder 4 has two dogs 5 and 6 and is urged by a spring 7 towards the bearing 2. It is prevented from moving to that bearing 2 by two pieces of fusible material 8 and 9. As an alternative, the two pieces of fusible material could be replaced by a single piece of fusible material which is annular and disposed about the shaft. The two pieces of fusible material 8 and 9 are held in position on the shaft by a spring ring 10. As will be seen in the drawings, an end of each piece of fusible material is in contact with the inner race of the bearing 2.

The locking device also includes two dog-receiving recesses 11 and 12 formed in the flange 13 of the end ring 14 of the roller 1. The surface of each dog-receiving recess, 11 and 12, which will be adjacent the outer surface of a dog, 5 or 6, when the cylinder has moved up to the bearing 2, is suitably contoured for a purpose which will be described later.

In operation, the roller 1 will rotate about the shaft 3. Should the bearing 2 sustain damage, heat will be generated in the region of the bearing and this will eventually cause the fusible pieces 8 and 9 to melt. When this happens, the spring 7 will force the cylinder 4 towards the bearing 2, and the dog 5 will enter one of the recesses 11 or 12, and the dog 6 will enter the other of the recesses.

Because of the contour of the said surfaces of the recesses 11 and 12, the dogs 5 and 6, particularly if of soft material, will increasingly bind on those surfaces as rotation continues, until the roller comes to a standstill. Then, the roller will be locked to the shaft 3.

As an alternative to having suitably contoured surfaces in the dog-receiving recesses, those surfaces may be such, as shown in chain-dotted lines in FIG. 2, as not to interfere with the dogs when the fusible material has melted. The recesses will have end walls against which the dogs will eventually abut in order to prevent further rotation of the shaft.

The pieces of fusible material may be fitted into location slots at the end of the cylinder 4.

Referring to FIGS. 3 and 4, the locking device of the second embodiment includes a hair-pin-like member 20 having integral clips 21 and 22, by which it can be attached to a shaft 23. The free ends of the member 20 are held together by a rivet 24 made of a fusible material which engages the shaft. The member 20 has a tang 25, engaging with a suitable slot 26 formed in the shaft, to locate the member and to prevent it from rotating with respect to the shaft. The rivet 24 is as close to the bearing as possible and forms a heat-sensitive member.

The flange 27 of the end ring 28 of the roller 29 is provided with at least one elongate slot 30, with end walls 31 and 32.

Should the bearing 33 sustain damage when the roller is rotating, heat will be generated in the region of the bearing, and eventually the rivet 24 will melt. The upper limb 20a of the member 20 then will spring radially outwardly towards the position shown in chain-dotted lines in FIG. 3. It will eventually engage with the elongate slot 30 and, during further rotation, will abut against an end wall 31 or 32, depending on the direction of rotation, and relative rotation will then cease.

Referring to FIGS. 5 and 6, in the third embodiment a roller 41 (only part of which is shown) is mounted at each end portion (only one of which is shown) by way of a ball bearing 42 for rotation about a stationary shaft 43.

A locking device 44 includes a flanged annular member 45 which is suitably held fast with respect to the roller 41 and the outer race 46 of the ball bearing. The inner race 47 of the ball bearing is fast with respect to the shaft 43.

The flange 48 of the member 45 extends towards the shaft 43 and has a close clearance fit with respect thereto as shown at 49 so that it forms a guard for excluding foreign matter from the locking device and bearing assembly.

On its inner surface the main portion of the member 45 is provided with a groove 50 which as shown in FIG. 6 has a base which is generally of elliptical profile having recesses 51 and 52 in the positions indicated. A radial bore 53 is also provided in the member 45 as shown into which the shank 54 of a heat-sensitive member 55 is fitted.

The member 55 is made from a fusible material and its head portion 56 is engaged by the inturned ends 57, 58 of a locking ring 59. This ring is generally of C-shape, of generally rectangular cross-section and of spring steel. The ring is designed to spring inwardly and thus is expanded against its inherent resilience by the member 55 when in place as shown. Also, the ring is provided with upstanding projections 60, 61 which, with the ring in its expanded and inoperative condition, respectively seat in the recesses 51, 52. Further, the ring is provided with another upstanding projection 62 which seats in the groove 50. Diametrically-opposed spike portions 63, 64 are formed integrally with the ring 59 and when the ring is in its expanded and inoperative condition the spike portions are held clear of the shaft 43 as shown in full lines in FIG. 6.

In operation, the roller 41, member 45 and locking ring 59 will together rotate about the shaft 43. Should the bearing 42 sustain damage, heat will be generated in the region of the bearing and this will eventually cause the fusible material of the heat-sensitive member 55 to melt. When this happens the locking ring 59 will spring inwardly under its inherent resilience from its expanded condition to its contracted condition shown in chain-dotted lines in FIG. 6, the projections 60, 61 thereby moving radially-inwardly, and thus out from the recesses 51, 52.

The spike portions 63, 64 now engage the shaft 43, and the ring 59 is moved in the anti-clockwise direction as viewed in FIG. 6 between the shaft and the elliptically-shaped groove 50, being thus subjected to a significant wedging action. This will cause the spike portions to bite into the surface of the shaft as indicated in exaggerated manner at 65 and 66 in FIG. 6, such mechanical interference with the shaft causing progressive retardation and arrest of the roller 41 without such abruptness as might otherwise cause damage to the components of the locking device.

Referring now to the fourth embodiment shown in FIGS. 7 to 10 of the drawings, a roller 71 (only part of which is shown) is mounted at each end portion (only one of which is shown) by way of a ball bearing 72 for rotation about a stationary shaft 73.

As in the third embodiment the locking device 74 includes a flanged annular member 75 which is suitably held fast with respect to the roller 71 and the outer race 76 of the ball bearing. The inner race 77 of the bearing is fast with respect to the shaft 73.

In its inner peripheral surface 78 the main portion of the member 75 is provided with a groove 79 of annular shape and whose axis 80 of generation is offset as shown in FIGS. 8 and 10 from the rotational axis 81 of the roller 71. The groove 79 has a portion 82 of increased diameter and as seen with reference to FIGS. 8 to 10 two recesses 83 are formed in the member 75. These recesses open from, and lie transversely with respect to, the portion 82 of the groove 79 as shown.

Housed between the member 75 and the shaft 73 is a locking device which includes a bi-metallic element 84 of generally C-shape which is so apertured at 85 at one end portion 86 thereof as rotatably to retain a peripherally-serrated roller 87. The extremity at that end portion of the element 84 is provided with two projections 88 which, with the element in its unheated and thus expanded condition, engage the recesses 83 to hold the roller 87 in engagement with the portion 82 of the groove 79.

The remaining part of the element 84 is shaped as shown in FIGS. 8 and 10, bearing mainly on the inner peripheral surface 78 of the main portion of the member 75, with the other extremity 89 of the element engaging the groove 79 where shown.

In operation, the roller 71, member 75 and element 84 will rotate about the shaft 73. Should the bearing 72 sustain damage, heat will be generated in the region of the bearing and this will eventually cause the heat-sensitive member formed by the element 84 to contract from its expanded condition, in which it is shown in FIG. 8, to the condition as shown in FIG. 10. On this occurring the roller 87 moves out from the groove portion 82 and inwardly into engagement with the shaft 73. Since the projections 88 are simultaneously released from their recesses 83, the member 75 and roller 71 now overrun the element 84 which is now gripping the shaft 73. As the member 75 and roller 71 continue to rotate with respect to the element 84 and shaft, the roller 87 mechanically engages the base of the groove 79 and the surface of the shaft 73. However, since these surfaces are generated from spaced axes 80, 81, the roller 87 is wedged between these surfaces thereby affording, as in the third embodiment, progressive retardation and arrest of the roller 71 without such abruptness as might otherwise cause damage to the components of the locking device.

The bi-metallic locking element of this embodiment has the advantage over the first, second and third embodiments in that it can subsequently be used again, whereas in the construction of the first, second and third embodiments the fusible members disintegrate on heating and thus require replacement for further use of the locking devices of those embodiments.

Provision may be made in the construction of the second embodiment above described with reference to FIGS. 3 and 4 of the drawings to prevent sideways movement and/or distortion of the hair-pin-like member when the upper limb of the member abuts against an end wall of the elongate slot.

In an alternative to the second embodiment above described with reference to FIGS. 3 and 4, instead of using a rivet of fusible material, the fusible material can be disposed in contact with the bearing and have a slot or similar device to receive the end portions of the two limbs of a hair-pin-like member.

Although in all of the embodiments described above each heat-sensitive member is disposed wholly outside the shaft, in other embodiments part of each said member may be disposed within the shaft.

Although in the first, second and third embodiments above described with reference to the drawings each heat-sensitive member is made from a fusible material, and in the fourth embodiment that member comprises a bi-metallic element, in alternative embodiments of the invention the heat-sensitive member may take the form of any other suitable type of thermo-sensitive device which, when heated to a certain predetermined temperature, so moves as to cause the locking device to become operative.

Finally, although in the four embodiments above described with reference to the drawings each shaft is stationary and its roller is rotatable, in alternative embodiments of the invention the converse may be the case.

I claim:

1. A locking device for a member mounted by way of a bearing on a shaft, which member and shaft are relatively-rotatable, said locking device including a locking element, which in its operative position is engageable with at least one of said member and said shaft, and further including a heat-sensitive member which normally holds the locking element out of its operative position and which is disosed close to said bearing with part at least of said heat-sensitive member lying exteriorly of the shaft between said relatively-rotatable member and shaft, means including an inclined surface on one of said member and said shaft so that movement of the locking device into its operative condition to lock said member or shaft, whichever is rotating, occurs gradually, said locking element including a roller which is mechanically engageable with both said member and said shaft to effect locking.

2. A locking device as claimed in claim 1, wherein said heat-sensitive member is disposed between said member mounted by way of said bearing and said shaft and is adapted to carry said roller.

3. A locking device as claimed in claim 2, wherein said roller is peripherally-serrated.

4. A locking device including a member mounted by way of a bearing on a shaft, which member and shaft are relatively-rotatable, a locking element which is operatively engageable with an inclined surface portion on one of said member and shaft, and a heat-sensitive member which normally holds the locking element out of its operative engagement with said inclined surface portion, said heat-sensitive member being disposed close to said bearing with part at least of said heat-sensitive member lying exteriorly of the shaft between said relatively-rotatable member and shaft, said heat-sensitive member, upon heating thereof above a predetermined temperature, effecting movement of said element to its operative position in which it engages said inclined surface portion to afford gradual slowing of the relative rotation of said relatively-rotatable member and shaft and final locking of said member and shaft against relative rotation.

5. A locking device as claimed in claim 4, wherein said heat-sensitive member is made from a fusible material.

6. A locking device as claimed in claim 4, wherein said heat-sensitive member comprises a bi-metallic element.

7. A locking device as claimed in claim 4 wherein the locking element comprises dogs, carried by a cylinder mounted upon said shaft, with dog-receiving recesses formed in said member mounted by way of said bearing.

8. A locking device as claimed in claim 7, wherein said heat-sensitive member comprises pieces of fusible material held in position on said shaft by a spring ring, melting of said pieces permitting said dogs to be urged by spring means into engagement with said recesses.

9. A locking device as claimed in claim 4 wherein said locking element includes spike portions which are operative to effect locking by mechanical interference with said shaft.

10. A locking device for a member mounted by way of a bearing on a shaft, which member and shaft are relatively-rotatable and have surface portions which are inclined one with respect to the other, said locking device including a locking element, which is operatively engageable with both said member and said shaft, and a heat-sensitive member which carries said locking element, which normally holds the locking element out of its operative engagement, which is disposed close to said bearing and which lies between said relatively-rotatable member and shaft, said element comprising a peripherally-serrated roller which upon movement by said heat-sensitive member to its operative position is wedged between said inclined surface portions whereby locking of said relatively-rotatable member and shaft against relative rotation is caused to occur gradually.

* * * * *

UNITED STATES PATENT AND TRADEMARK OFFICE
CERTIFICATE OF CORRECTION

PATENT NO. : 4,477,126
DATED : October 16, 1984
INVENTOR(S) : Derek Thomas PRICE It is certified that error appears in the above—identified patent and that said Letters Patent is hereby corrected as shown below:

Column 5, line 47 (Claim 1) the word "disosed" should be "disposed"

Signed and Sealed this

Eleventh Day of June 1985

[SEAL]

Attest:

DONALD J. QUIGG

Attesting Officer — Acting Commissioner of Patents and Trademarks